(12) United States Patent
Su

(10) Patent No.: US 11,176,285 B2
(45) Date of Patent: Nov. 16, 2021

(54) VEHICLE SIMULATION DEVICE AND METHOD

(71) Applicant: PEGATRON CORPORATION, Taipei (TW)

(72) Inventor: Yang-Chi Su, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 164 days.

(21) Appl. No.: 16/558,199

(22) Filed: Sep. 2, 2019

(65) Prior Publication Data

US 2020/0134135 A1 Apr. 30, 2020

(30) Foreign Application Priority Data

Oct. 26, 2018 (TW) .................................. 107138015

(51) Int. Cl.

| G06F 17/00 | (2019.01) |
|---|---|
| G06F 30/15 | (2020.01) |
| G06F 9/451 | (2018.01) |
| H04L 29/08 | (2006.01) |
| H04L 29/06 | (2006.01) |
| G06F 119/18 | (2020.01) |

(52) U.S. Cl.
CPC .............. *G06F 30/15* (2020.01); *G06F 9/451* (2018.02); *H04L 67/12* (2013.01); *H04L 67/38* (2013.01); *G06F 2119/18* (2020.01)

(58) Field of Classification Search
CPC .......................... G06F 17/5009; G06F 17/5095
USPC ......................................................... 703/6, 8
See application file for complete search history.

(56) References Cited

U.S. PATENT DOCUMENTS

| 6,431,872 | B1 | 8/2002 | Shiraishi et al. |
| 8,016,595 | B2 | 9/2011 | Aoki et al. |
| 9,870,650 | B2 * | 1/2018 | Komada ............. G01M 17/007 |
| 10,474,913 | B2 | 11/2019 | Shinoda et al. |
| 10,559,217 | B2 * | 2/2020 | Alvarez .................. G06F 30/15 |
| 2003/0130040 | A1 | 7/2003 | Dripps |

(Continued)

FOREIGN PATENT DOCUMENTS

| CN | 103219030 B | 2/2017 |
| JP | 2000276038 A | 10/2000 |

(Continued)

*Primary Examiner* — Andy Ho
(74) *Attorney, Agent, or Firm* — Li & Cai Intellectual Property (USA) Office

(57) ABSTRACT

A vehicle simulation device and method, the device includes a user interface, a database, and a processing device. The user interface includes a scenario selection interface, a vehicle signal display interface, and a motion image display interface. The database stores external motion images and motion image description files associated with the external motion images. The motion image description file includes a plurality of time stamps and a plurality of vehicle operating parameters corresponding to each time stamp. The processing device is configured to load a corresponding external motion image to be displayed on the motion image display interface when the user selects a vehicle operation scenario, output the vehicle operating parameters corresponding to the time stamp according to the current time and the motion image description file of the displayed external motion image, and display the vehicle operating parameters on the vehicle signal display interface.

10 Claims, 6 Drawing Sheets

(56) References Cited

U.S. PATENT DOCUMENTS

| | | | |
|---|---|---|---|
| 2011/0103650 A1 | 5/2011 | Cheng et al. | |
| 2015/0310758 A1* | 10/2015 | Daddona | G09B 9/02 |
| | | | 434/62 |
| 2016/0371553 A1 | 12/2016 | Farnham, IV et al. | |
| 2020/0005662 A1* | 1/2020 | Palmer | G09B 9/052 |

FOREIGN PATENT DOCUMENTS

| | | | |
|---|---|---|---|
| JP | 2004246215 A | 9/2004 | |
| JP | 20161172 A | 1/2016 | |
| KR | 1020180068355 A | 6/2018 | |
| TW | 200828193 A | 7/2008 | |
| TW | 201025185 A1 | 7/2010 | |
| TW | I365145 B1 | 6/2012 | |
| TW | M488645 U | 10/2014 | |
| TW | 201631557 A | 9/2016 | |
| WO | 2017159186 A1 | 9/2017 | |

\* cited by examiner

VEHICLE SIMULATION DEVICE AND METHOD

CROSS-REFERENCE TO RELATED PATENT APPLICATION

This application claims the benefit of priority to Taiwan Patent Application No. 107138015, filed on Oct. 26, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

BACKGROUND

Technology Field

The present disclosure relates to a vehicle simulation device and method, and more particularly to a vehicle simulation device and method for simultaneously outputting vehicle body parameter signals while outputting external motion images in different scenarios.

Description of the Related Art

In an existing engine control unit (ECU) simulator, a computer-edited packet data is generally sent out via a Controller Area Network (CAN) signal processing device for experimental purposes, in which only CAN signals are sent out, but not in accompaniment with a driving video.

The vehicle CAN signals are often required when developing a vehicle system. However, the CAN signals are transmitted without the driving video, thereby failing to provide a user with more intuitive understanding of the vehicle body parameter signals that may be generated in different scenarios. Therefore, due to a lack of continuity in actual driving and a continuity of signal matching, it is difficult to accurately design related application services or programs according to the scenarios and the vehicle body signal parameters when designing a vehicle system.

In addition, in an existing vehicle system development environment, since the output signals and specifications of the various vehicle models for different brands are not unified, it is difficult for designers to design related services and programs that are applicable to the vehicle models for all the brands. In contrast, each vehicle model and corresponding output signals must be obtained individually, which leads to a significant increase in design costs.

Therefore, improving an accuracy of the design for the vehicle system through the improvement and integration of the vehicle system development environment has become an important issue in the arts.

SUMMARY

In response to the above-referenced technical inadequacies, the present disclosure provides a vehicle simulation device and method capable of synchronously outputting a vehicle body parameter signal while outputting a scenario image.

In one aspect, the present disclosure provides a vehicle simulation device including a user interface, a database, and a processing device. The user interface includes a scenario selection interface, a vehicle signal display interface, and a motion image display interface. The scenario selection interface has a plurality of vehicle operating scenario options for selection. The motion image display interface is configured to display an external motion image corresponding to the selected vehicle operating scenario option. The database is configured to store the external motion image and a motion image description file associated with the external motion image, the motion image description file includes a plurality of time stamps and a plurality of vehicle operating parameters corresponding to each time stamp. The processing device is communicatively connected to the user interface, and configured to, when one of the vehicle operating scenario options is selected, load the external motion image corresponding to the selected vehicle operating scenario option for displaying the external motion image on the motion image display interface. The processing device is configured to output, according current time of the displayed external motion image and the motion image description file, the vehicle operating parameters of the time stamp corresponding to the current time to be displayed on the vehicle signal display interface.

In one aspect, the present disclosure provides a vehicle simulation method for a vehicle simulation device, the vehicle simulation method includes: providing a vehicle signal display interface, a motion image display interface, and a scenario selection interface having a plurality of vehicle operation scenario options on a user interface; receiving a first selection input from the scenario selection interface, in which the first selection input corresponds to one of the vehicle operation scenario options; loading an external motion image corresponding to the selected vehicle operating scenario option, in which the external motion image is associated with a motion image description file, and the motion image description file includes a plurality of time stamps and a plurality of vehicle operating parameters corresponding to each time stamp; displaying the external motion image on the motion image display interface; outputting, according to current time of the displayed external motion image and the motion image description file, the vehicle operating parameters of the time stamp corresponding to the current time; and displaying the vehicle operating parameters of the time stamp corresponding to the current time on the vehicle signal display interface.

Therefore, the vehicle simulation device and method provided by the present disclosure can synchronously output the vehicle body parameter signal when outputting the external motion image in different scenarios, so as to provide the user with a more intuitive understanding of the vehicle parameter signals that may be generated in different scenarios of the vehicle. Therefore, it is ensured that the designer can understand the consistency of actually driving the vehicle and the continuity of the signal compatibility, so that the designer can accurately match the scenarios when designing the vehicle system, and design related application services or programs according to the vehicle body parameter signals.

In addition, compared with an existing vehicle system development environment, the vehicle simulation device and method provided by the present disclosure integrate output signals and specifications of different manufacturers and vehicle models, so that the designer can design related application services and programs suitable for various vehicle models of different brands without individually obtaining their output signals of various vehicle models of different brands, thereby significantly reducing design costs.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
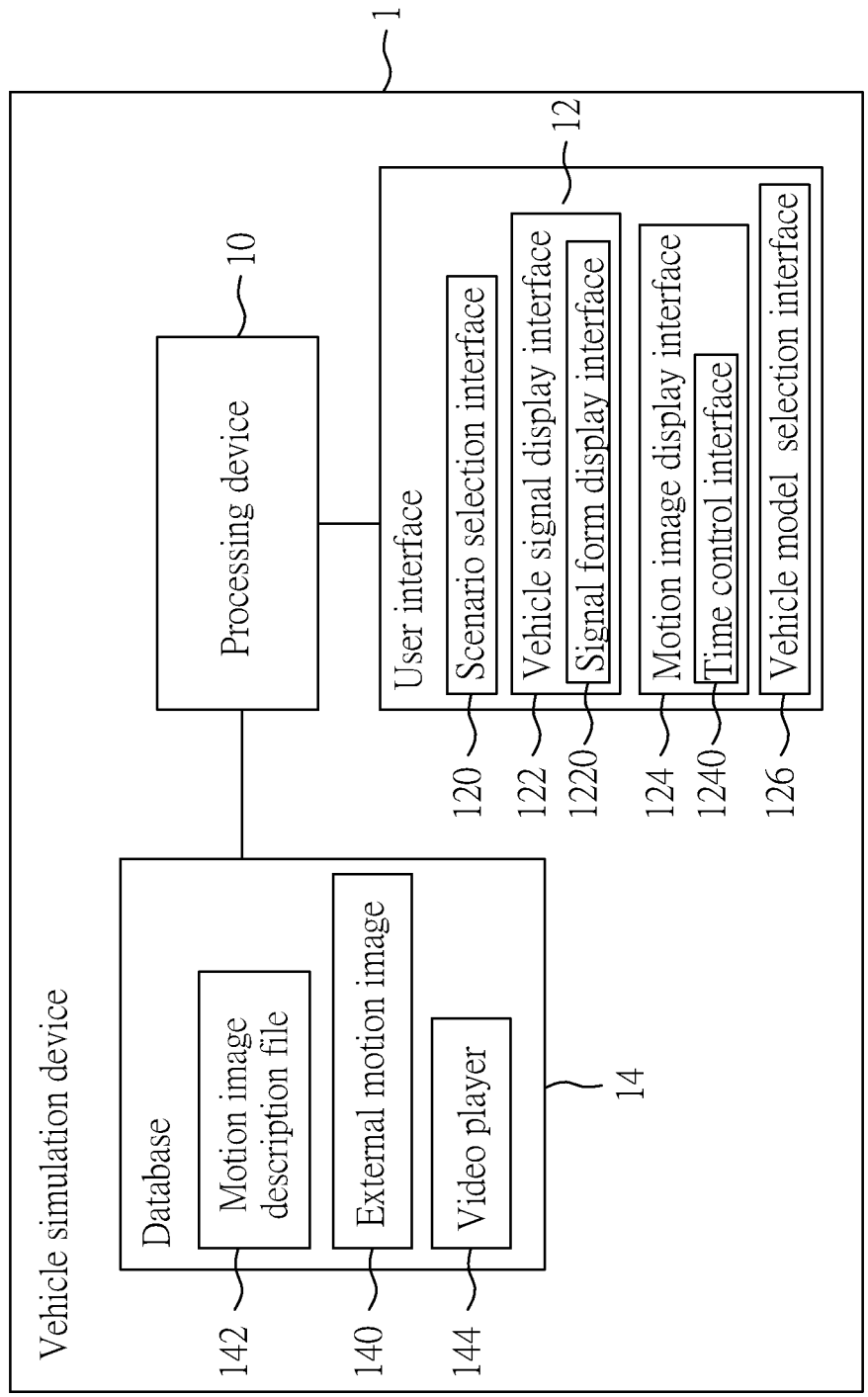
FIG. 1 is a block diagram of a vehicle simulation device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

Referring to FIG. 1, a first embodiment of the present disclosure provides a vehicle simulation device 1 including a user interface 12, a database 14, and a processing device 10. The user interface 12 includes a scenario selection interface 120, a vehicle signal display interface 122, and a motion image display interface 124.

The vehicle simulation device 1 may be, for example, a laptop, a smart phone, a small personal computer, a personal digital assistant, or the like. The function of the processing device 10 included in the vehicle simulation device 1 may be implemented by using one or more processing units. The processing device 10 may be a programmable unit such as a microprocessor, a microcontroller, a digital signal processor (DSP) chip, a field-programmable gate array (FPGA), or the like. The functionality of the processor may also be implemented by one or several electronic devices or ICs. In other words, the functions performed by the processing device 10 may be implemented in a hardware domain or a software domain or a combination of the hardware domain and the software domain.

Moreover, various data in the database 14 may be stored in one or more storage devices in the vehicle simulation device 1, such as a disk drive, a disk storage device, and a solid state storage device, such as random access memory (RAM) or read-only memory (ROM), as well as removable media devices, memory cards, flash memory cards, and the like.

The database 14 is configured to store one or more external motion images 140 and one or more motion image description files 142 associated with the external motion images. Take an example of the external motion image 140 corresponding to a car breakdown scenario, the motion image description file 142 includes a plurality of time stamps, each time stamp corresponds to a plurality of vehicle operating parameters (for example, total mileage, steering wheel, brake occlusion, brake pedal position, gear position, fuel consumption status, lamp status, door sensing, vehicle speed, engine speed, engine temperature, air flow, ambient temperature, tank percentage, emergency signal, diagnostic trouble code (DTC), direction light, remaining fuel). The time stamps cover the time duration of the external motion image 140 and are separated by predetermined time intervals. The motion image description file 142 records the vehicle operating parameters of the external motion image 140 at all of time points in an array. The motion image description file 142 is shown in Tables 1 to 3 below:

TABLE 1

| Time stamp | Total mileage | steering wheel | Brake | Brake pedal position | Gear position | Fuel consumption | Headlight status |
|---|---|---|---|---|---|---|---|
| 45 | 21305 | 0 | 0 | 0 | D 1 | 15 | 0 |
| 45.1 | 21305 | 0 | 0 | 0 | D 1 | 15 | 0 |
| 45.2 | 21305 | 0 | 0 | 0 | D 1 | 15 | 0 |
| 45.3 | 21305 | 0 | 0 | 0 | D 1 | 15 | 0 |
| 45.4 | 21305 | 0 | 0 | 0 | D 1 | 15 | 0 |
| 45.5 | 21305 | 0 | 0 | 0 | D 1 | 15 | 0 |
| 45.6 | 21305 | 0 | 0 | 0 | D 1 | 15 | 0 |
| 45.7 | 21305 | 0 | 0 | 0 | D 1 | 15 | 0 |
| 45.8 | 21305 | 0 | 0 | 0 | D 1 | 15 | 0 |
| 45.9 | 21305 | 0 | 0 | 0 | D 1 | 15 | 0 |

TABLE 2

| Time stamp | Door sensing (including rear car) | Speed | Engine speed | Engine temperature | Air flow | Ambient temperature | Fuel tank percentage |
|---|---|---|---|---|---|---|---|
| 45 | 0 | 43 | 1960 | 130 | 0 | 0 | 0 |
| 45.1 | 0 | 43 | 1940 | 130 | 0 | 0 | 0 |
| 45.2 | 0 | 43 | 1920 | 130 | 0 | 0 | 0 |

TABLE 2-continued

| Time stamp | Door sensing (including rear car) | Speed | Engine speed | Engine temperature | Air flow | Ambient temperature | Fuel tank percentage |
|---|---|---|---|---|---|---|---|
| 45.3 | 0 | 43 | 1900 | 130 | 1 | 21 | 100 |
| 45.4 | 0 | 43 | 1880 | 130 | 1 | 21 | 100 |
| 45.5 | 0 | 43 | 1860 | 130 | 1 | 21 | 100 |
| 45.6 | 0 | 43 | 1840 | 130 | 1 | 21 | 100 |
| 45.7 | 0 | 43 | 1820 | 130 | 1 | 21 | 100 |
| 45.8 | 0 | 43 | 1800 | 130 | 1 | 21 | 100 |
| 45.9 | 0 | 43 | 1795 | 130 | 1 | 21 | 100 |

TABLE 3

| Time stamp | Emergency signal (airbag) | Diagnostic Trouble Code (DTC) | Directional light | Remaining fuel |
|---|---|---|---|---|
| 45 | 0 | | 0 | 0 |
| 45.1 | 0 | | 0 | 0 |
| 45.2 | 0 | | 0 | 0 |
| 45.3 | 0 | | 0 | 62 |
| 45.4 | 0 | P0168.P0198 | 0 | 62 |
| 45.5 | 0 | P0168.P0198 | 0 | 62 |
| 45.6 | 0 | P0168.P0198 | 0 | 62 |
| 45.7 | 0 | P0168.P0198 | 0 | 62 |
| 45.8 | 0 | P0168.P0198 | 0 | 62 |
| 45.9 | 0 | P0168.P0198 | 0 | 62 |

The motion image description file 142 corresponds to a scenario in which the vehicle in the external motion image 140 has a breakdown, and the motion image description file 142 may cover the duration of the entire external motion image 140. In Tables 1 to 3, only data at around 45 seconds is provided as an example. It can be seen from Table 3 that a breakdown event occurs after 45.4 seconds, and the diagnostic trouble codes (DTCs) are P0168 and P0198; where P0168 represents that the engine temperature is too high, and P0198 represents that the fuel temperature is too high. It should be noted that the time stamps in Tables 1 to 3 correspond to the elapsed time of the external motion image 140, and the above-mentioned seconds are only examples.

The user interface 12 can be displayed on a display screen of a laptop, a smart phone, a small personal computer, a personal digital assistant, and the like, the user interface 12 includes a human-computer interaction and a graphical user interface, such that the user is able to design the vehicle system and related applications conveniently and efficiently. For details, the reference is made to FIGS. 2 to 4, which are schematic diagrams of a vehicle model selection interface 126, a scenario selection interface 120, a vehicle signal display interface 122 and a motion image display interface 124 according to an embodiment of the present disclosure. The processing device 10 is capable of loading the external motion image 140 from the database 14 and calling a video player 144 (for example, Media Player) built in the vehicle simulation device 1 by using Windows application programming interface (API) in an operating system (such as Windows) of a general home computer to play the external motion image 140 on the motion image display interface 124. The processing device 10 further captures current time of the external motion image 140 while the external motion image 140 is playing, and finds a time stamp corresponding to the current time from the multiple time stamps in the motion image description file 142, and obtains the vehicle operating parameters corresponding to the found time stamp.

Figure 2:
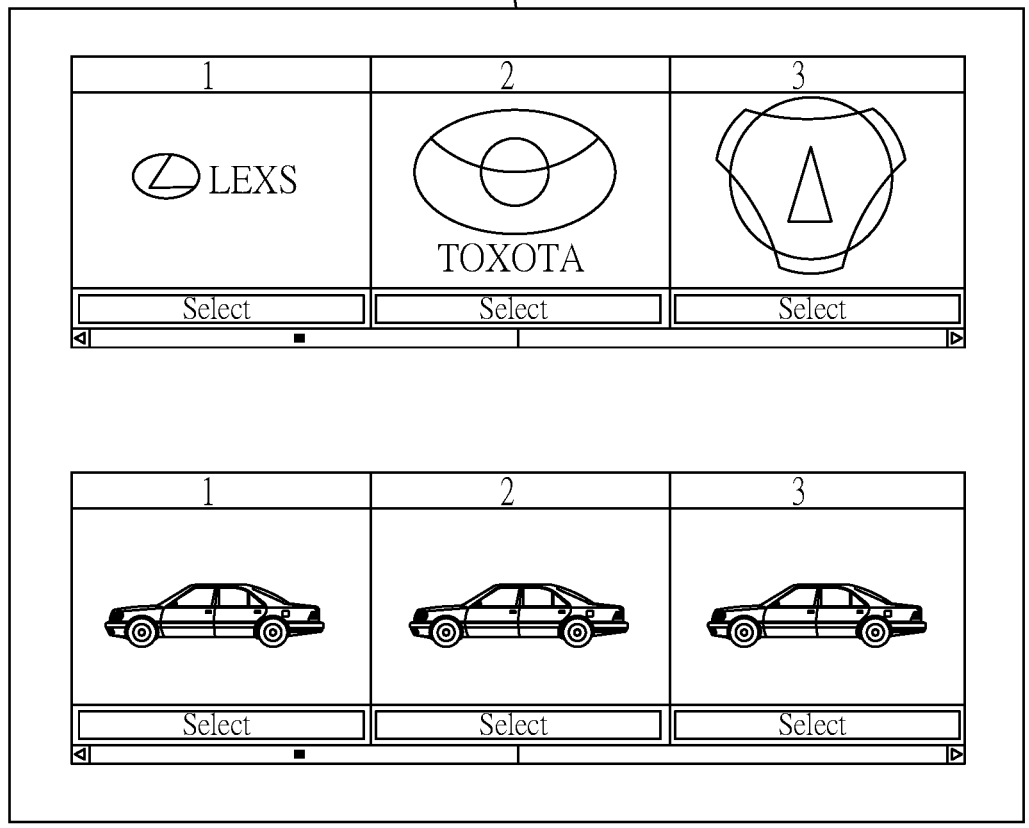
FIG. 2 is a schematic diagram of a vehicle model selection interface of the vehicle simulation device according to an embodiment of the present disclosure.

As shown in FIG. 2, the vehicle model selection interface 126 may include a plurality of vehicle manufacturers and a plurality of vehicle models for the user to select and receive selection inputs from the user. In the present embodiment, vehicle body signals of an actual vehicle are pre-recorded and analyzed for different vehicle manufacturers and vehicle models, for example, the formats of the vehicle body signals of the respective vehicle manufacturers, to be integrated into the user interface 12. Therefore, the user can simulate different vehicle operation scenarios through the vehicle simulation device 1 of the present disclosure. It is not necessary to actually operate the vehicle in various vehicle operating scenarios to obtain the vehicle body signals. Therefore, design costs can be drastically reduced.

Figure 3:
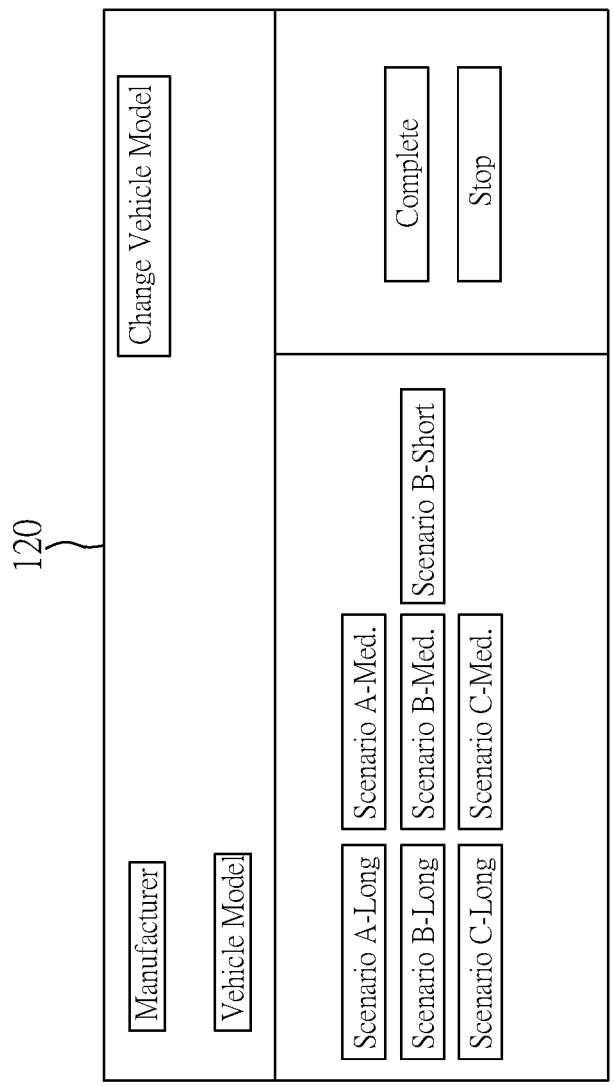
FIG. 3 is a schematic diagram of a scenario selection interface of a vehicle simulation device according to an embodiment of the present disclosure.

Next, as shown in FIG. 3, the scenario selection interface 120 may include a plurality of vehicle operating scenario options that could be selected. Regarding the different vehicle operating scenario options, the external motion images 140 with various durations are provided.

Figure 4:
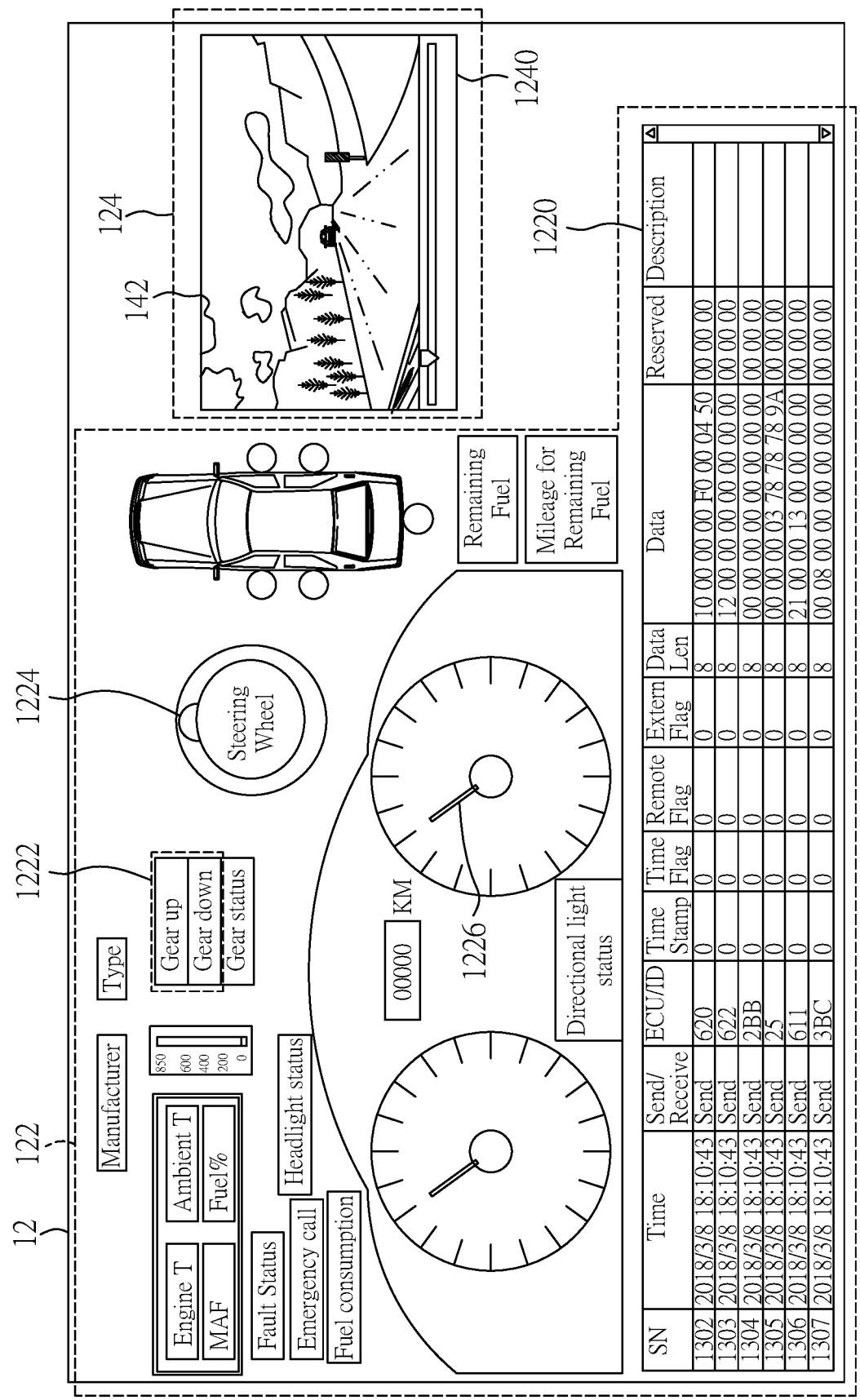
FIG. 4 is a schematic diagram of a vehicle signal display interface and a motion image display interface of a vehicle simulation device according to an embodiment of the present disclosure.

Moreover, as shown in FIG. 4, the vehicle signal display interface 122 is configured to display a plurality of vehicle operating parameters, and the motion image display interface 124 is configured to display an external motion image corresponding to the selected vehicle operating scenario option. The displayed vehicle operating parameters are shown in Tables 1 to 3 and include engine temperature, ambient temperature, fuel tank percentage, lamp status, fuel consumption status, engine speed, total mileage, brake status, gear position, steering wheel status, dashboard, door status, remaining fuel and speed. That is to say, when the vehicle is actually in operation, the vehicle body signals generated or received by various components of the vehicle are captured, and then the vehicle body signals are analyzed to correspond to the vehicle operating parameters displayed on the vehicle system. The mapping between the vehicle body signals and the displayed vehicle operating parameters can be obtained, and analysis results are integrated into a graphical interface to be presented. In the present embodiment, the vehicle signal display interface 122 further includes a signal form display interface 1220 for displaying the packet format of the vehicle body signals, which can be directly used by a controller area network (CAN) signal processing device. As shown in FIG. 4, the packet format of the vehicle body signals may include a plurality of fields, wherein SN field represents packet sequence numbers; Time field represents system time on the vehicle simulation device 1; Send/Receive field is associated with transmission and reception of a request function; ECU/ID field represents vehicle operating parameters, for example, value 620 represents a door open state, value 622 represents a headlight ON state, value 25 represents a steering wheel angle, value 611 represents the total mileage, value 3BC represents the gear position; Time Stamp field/Time Flag field/Remote Flag field/Extern Flag field are defined according to a specific communication protocol (for example, J1979); DataLen field represents the lengths of a packet; Data field represents the values of the formatted vehicle operating parameters; and the Reserved field is reserved. The fields of the signal form display interface 1220 are merely embodiments of the present disclosure, and are not limited thereto. Specifically, the vehicle body signals displayed by the signal form display interface 1220 can be directly output to the controller area network signal processing device.

When the user selects one of the vehicle operating scenario options through the scenario selection interface 120, the processing device 10 receives the selection input from the user and correspondingly loads corresponding information according to the selected vehicle operating scenario option. The external motion image 140 is displayed on the motion image display interface 124, the vehicle operating parameters corresponding to the time stamp are then output according to the current time of the displayed external motion image 140, and the vehicle operating parameters are displayed on the vehicle signal display interface 122.

Therefore, the vehicle simulation device provided by the present disclosure can synchronously output the vehicle body parameter signals when outputting the external motion images in different scenarios, so as to provide the user with more intuitive understanding of the vehicle parameter signals that may be generated in different scenarios of the vehicle. Therefore, it is ensured that the designer can understand the consistency of actually driving the vehicle and the continuity of the signal compatibility, so that the designer can accurately match the scenarios when designing the vehicle system, and design related application services or programs according to the vehicle body operating parameters.

In addition, the motion image display interface 124 further includes a time control interface 1240 for controlling the playing of the external motion image 140 of the motion image display interface 124 according to operating inputs from the user. For example, the time control interface 1240 may be a time sliding bar, and the user can control the playing of the external motion image 140 through the time sliding bar, for example, to fast forward, reverse, or jump to a specified time point.

In addition to displaying the vehicle operating parameters corresponding to the external motion image 140, the user can experimentally set the vehicle operating parameters through the vehicle signal display interface 122, such as a gear position adjustment button 1222, a steering wheel control button 1224, and a vehicle speed pointer 1226, to further obtain the vehicle body parameter signals in various preset operating situations. The user can design related application services and programs according to the parameter signals.

A vehicle simulation method of the present disclosure will be described in detail below based on FIG. 5. In the present embodiment, the vehicle simulation method is mainly applicable to the embodiments of FIG. 1 to FIG. 4, but is not limited thereto. The method provided by this embodiment can also be applied to any of the embodiments described above in manners or various possibilities that can be conceived by a person of ordinary skill in the arts.

Figure 5:
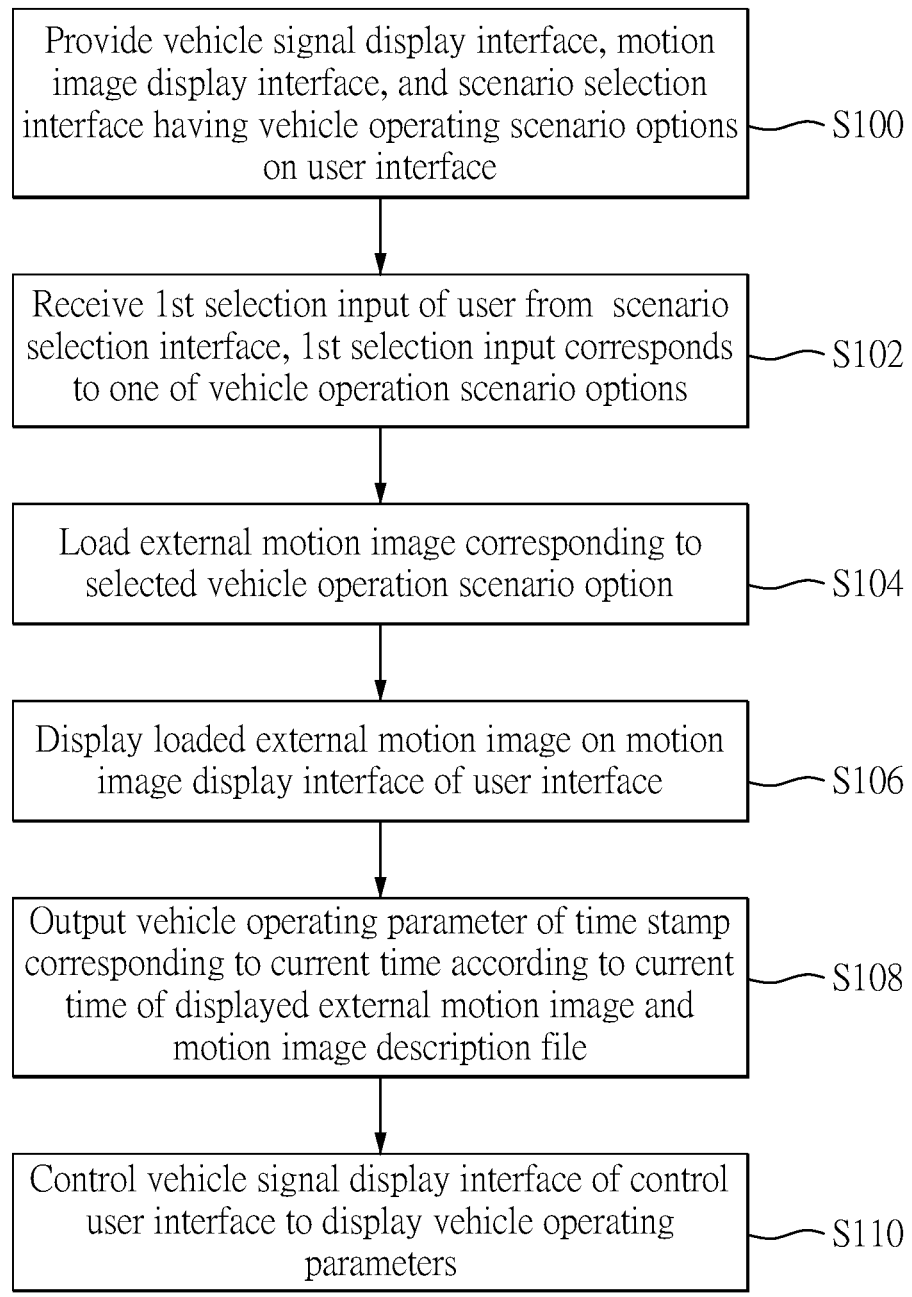
FIG. 5 is a flowchart of a vehicle simulation method according to an embodiment of the present disclosure.

Reference is made to FIG. 5, which is a flowchart of a vehicle simulation method according to an embodiment of the present disclosure. As shown in FIG. 5, the vehicle simulation method of the present disclosure can be applied to the vehicle simulation device 1 in the foregoing embodiments. The vehicle simulation device 1 includes the vehicle signal display interface 122, the motion image display interface 124, and the scenario selection interface 120 having vehicle operating scenario options, the vehicle simulation method includes the following steps:

Step S100: Provide the vehicle signal display interface 122, the motion image display interface 124, and a scenario selection interface 120 having vehicle operation scenario options on the user interface 12.

Step S102: Receive a first selection input of the user from the scenario selection interface 120 of the user interface 12, the first selection input corresponding to one of the vehicle operation scenario options.

Step S104: Load the external motion image 140 corresponding to the selected vehicle operation scenario option. Similarly, the external motion image 140 is associated with the motion image description file 142 that includes the time stamps and the vehicle operating parameters corresponding to each time stamp.

Step S106: Display the loaded external motion image 140 on the motion image display interface 124 of the user interface 12.

Step S108: Output the vehicle operating parameters of the time stamp corresponding to current time according to the current time of the displayed external motion image 140 and the motion image description file 142.

Step S110: Control the vehicle signal display interface 122 of the control user interface 12 to display the vehicle operating parameters. However, the above-mentioned examples are only one of the possible embodiments and are not intended to limit the present disclosure.

Figure 6:
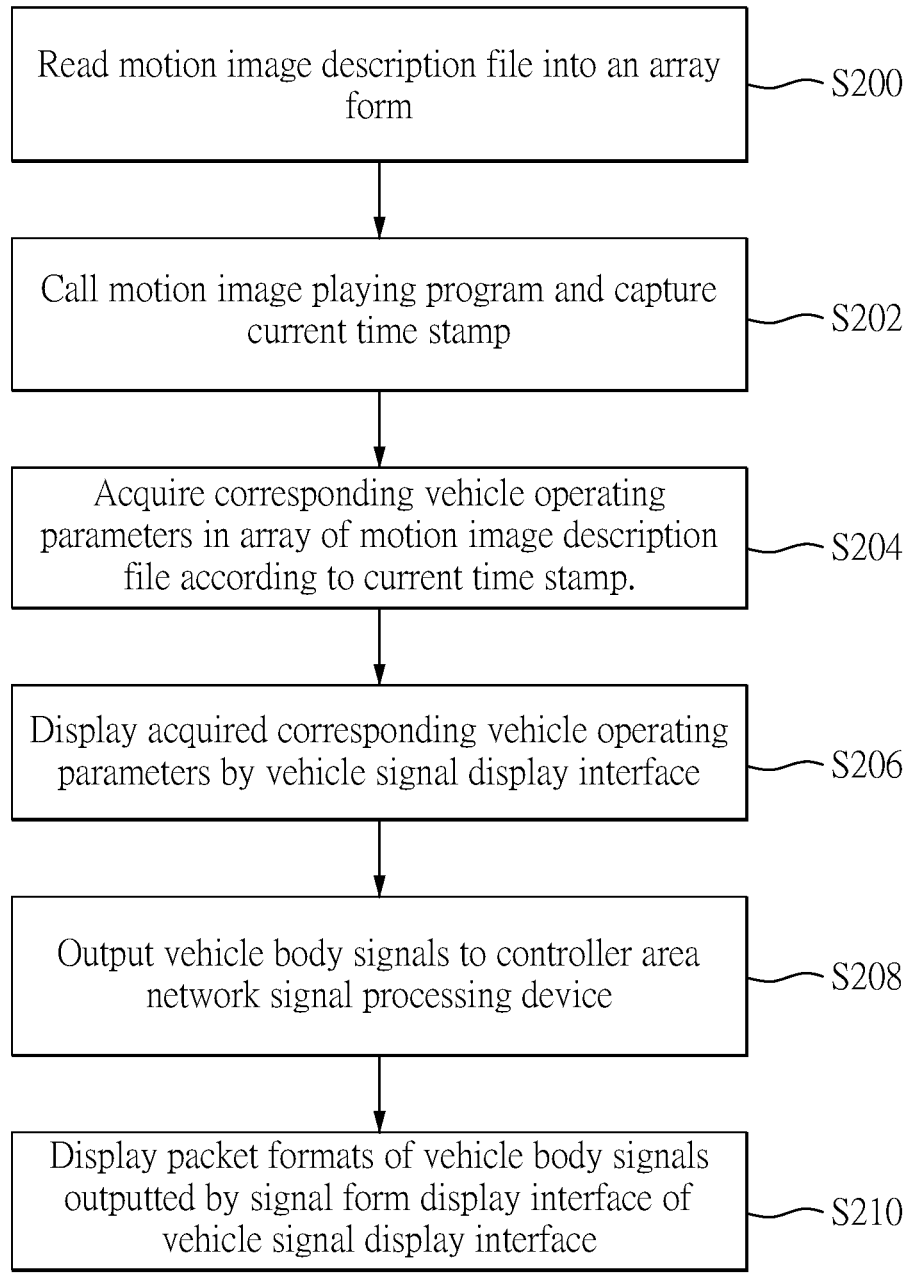
FIG. 6 is another flow chart of a vehicle simulation method according to an embodiment of the present disclosure.

Reference is made to FIG. 6, which is another flowchart of a vehicle simulation method according to an embodiment of the present disclosure. In steps S108 to S110, the following steps may be further included:

Step S200: Read the motion image description file into an array form.

Step S202: Call the motion image playing program and capture a current time stamp.

Step S204: Acquire the corresponding vehicle operating parameters in the array of the motion image description file according to the current time stamp.

Step S206: Display the acquired corresponding vehicle operating parameters by the vehicle signal display interface 122.

Step S208: Output vehicle body signals to a controller area network signal processing device.

Step S210: Display the packet format of the vehicle body signals outputted in the foregoing step S208 by the signal form display interface 1220 of the vehicle signal display interface 122. Therefore, the user can not only learn of the current vehicle operating parameters through the graphical interface, but can also learn of the packet format of the vehicle body signals used by different models of vehicles through the signal form display interface 1220.

In conclusion, according to the vehicle simulation device and method provided by the present disclosure, the vehicle body signals can be simultaneously output while outputting the external motion images in different scenarios.

In addition, compared with the existing vehicle system development environment, the vehicle simulation device and method provided by the present disclosure provide the packet format of the vehicle body signals of different manufacturers and vehicle models for the designer, so that the designer can design related application services and programs suitable for various vehicle models of different brands without individually obtaining their output signals of various vehicle models of different brands, thereby significantly reducing design costs.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A vehicle simulation device comprising:
    a user interface, including:
        a scenario selection interface having a plurality of vehicle operating scenario options for selection;
        a vehicle signal display interface; and
        a motion image display interface configured to display an external motion image corresponding to the selected vehicle operating scenario option;
    a database configured to store the external motion image and a motion image description file associated with the external motion image, wherein the motion image description file includes a plurality of time stamps and a plurality of vehicle operating parameters corresponding to each time stamp; and
    a processing device, communicatively connected to the user interface, and configured to, when one of the vehicle operating scenario options is selected, load the external motion image corresponding to the selected vehicle operating scenario option from the database and call a video player to play the external motion image on the motion image display interface, wherein the processing device is configured to output, according current time of the external motion image displayed on the motion image display interface and the motion image description file, the vehicle operating parameters of one of the time stamps to be displayed on the vehicle signal display interface;
    wherein the motion image description file records the vehicle operating parameters of the external motion image at all of time points in an array, and a step of outputting, according the current time of the external motion image displayed on the motion image display interface and the motion image description file, the vehicle operating parameters of one of the time stamps includes:
        reading the motion image description file associated with the external motion image from the database;
        capturing the current time of the external motion image displayed on the motion image display interface;
        finding a time stamp corresponding to the current time form the time stamps in the motion image description file; and
        outputting the vehicle operating parameters of the time stamp.

2. The vehicle simulation device according to claim 1, wherein the user interface further comprises a vehicle model selection interface including a plurality of vehicle models provided for the user to select.

3. The vehicle simulation device according to claim 1, wherein the vehicle operating parameters comprise at least one of engine temperature, ambient temperature, fuel tank percentage, lamp state, fuel consumption status, engine speed, total mileage, brake status, gear position, steering wheel status, dashboard, door status, remaining fuel capacity, and vehicle speed.

4. The device simulation device according to claim 1, wherein the vehicle signal display interface further comprises a signal form display interface, the signal form display interface is configured to display a packet format of a vehicle body signal, and the vehicle body signal is transmitted to a controller area network signal processing device, and the packet format is able to be directly used by the controller area network signal processing device.

5. The device simulation device according to claim 1, wherein the user interface further comprises a time control interface configured to receive an operation input of the user and control a playing time of the external motion image according to the operation input of the user.

6. A vehicle simulation method for a vehicle simulation device, the vehicle simulation method comprising:
    providing a vehicle signal display interface, a motion image display interface, and a scenario selection interface having a plurality of vehicle operation scenario options on a user interface;
    receiving a first selection input from the scenario selection interface, wherein the first selection input corresponds to one of the vehicle operation scenario options;
    loading an external motion image corresponding to the selected vehicle operating scenario option from a database and calling a video player to play the external motion image on the motion image display interface, wherein the database stores the external motion image and a motion image description file associated with the external motion image, and the motion image description file includes a plurality of time stamps and a plurality of vehicle operating parameters corresponding to each time stamp;
    outputting, according to current time of the external motion image displayed on the motion image display interface and the motion image description file, the vehicle operating parameters of one of the time stamps; and
    displaying the vehicle operating parameters on the vehicle signal display interface;
    wherein the motion image description file records the vehicle operating parameters of the external motion image at all of time points in an array, and a step of outputting, according the current time of the external motion image displayed on the motion image display interface and the motion image description file, the vehicle operating parameters of one of the time stamps includes:
        reading the motion image description file associated with the external motion image from the database;
        capturing the current time of the external motion image displayed on the motion image display interface;
        finding a time stamp corresponding to the current time form the time stamps in the motion image description file; and
        outputting the vehicle operating parameters of the time stamp.

7. The vehicle simulation method according to claim 6, wherein the user interface further comprises a vehicle model selection interface having a plurality of vehicle models, and the vehicle simulation method further comprising: receiving a second selection input of the user from the vehicle model selection interface, wherein the second selection input corresponds to one of the vehicle models.

8. The vehicle simulation method according to claim 6, wherein the vehicle operating parameters include at least one of engine temperature, ambient temperature, fuel tank percentage, lamp state, fuel consumption status, engine speed, total mileage, brake status, gear position, steering wheel status, dashboard, door status, remaining fuel capacity, and vehicle speed.

9. The vehicle simulation method according to claim 6, wherein the vehicle signal display interface further includes a signal form display interface, and the simulation method further comprises:
   displaying a packet format of a vehicle body signal on the display interface; and
   transmitting the vehicle body signal to a controller area network signal processing device, the packet format being able to be directly used by the controller area network signal processing device.

10. The vehicle simulation method according to claim 6, wherein the user interface further comprises a time control interface, and the vehicle simulation method further comprising:
   receiving an operation input of the user from the time control interface; and
   controlling a playing time of the external motion image according to the operation input of the user.

\* \* \* \* \*